US010354389B2

(12) United States Patent
Weese et al.

(10) Patent No.: US 10,354,389 B2
(45) Date of Patent: Jul. 16, 2019

(54) ANALYZING AORTIC VALVE CALCIFICATION

(71) Applicant: KONINKLIJKE PHILIPS N.V., Eindhoven (NL)

(72) Inventors: Juergen Weese, Norderstedt (DE); Alexandra Groth, Hamburg (DE); Jochen Peters, Norderstedt (DE); Irina Wachter-Stehle, Hamburg (DE); Sabine Mollus, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 92 days.

(21) Appl. No.: 15/510,096

(22) PCT Filed: Sep. 11, 2015

(86) PCT No.: PCT/EP2015/070779
§ 371 (c)(1),
(2) Date: Mar. 9, 2017

(87) PCT Pub. No.: WO2016/038169
PCT Pub. Date: Mar. 17, 2016

(65) Prior Publication Data
US 2017/0301096 A1 Oct. 19, 2017

(30) Foreign Application Priority Data
Sep. 12, 2014 (EP) .................................... 14184516

(51) Int. Cl.
*G06K 9/00* (2006.01)
*G06T 7/12* (2017.01)
(Continued)

(52) U.S. Cl.
CPC .............. *G06T 7/12* (2017.01); *G06T 7/0012* (2013.01); *G06T 15/10* (2013.01); *G06T 19/00* (2013.01);
(Continued)

(58) Field of Classification Search
CPC . G06T 2207/30048; G06T 2207/30101; G06T 7/0012; G06T 2207/10121;
(Continued)

(56) References Cited

U.S. PATENT DOCUMENTS 9,317,919 B2    4/2016  Waechter-Stehle et al.
9,445,777 B2    9/2016  Kitamura
(Continued)

FOREIGN PATENT DOCUMENTS

RU    2306104 C1    9/2007
WO    2013156546 A2    10/2013

OTHER PUBLICATIONS

Schoenhagen et al., Computed tomography in the evaluation for transcatheter aortic valve implantation (TAVI), 2011, Cardiovasc Diagn Ther 2011;1(1):44-56.*
(Continued)

*Primary Examiner* — Vu Le
*Assistant Examiner* — Guillermo M Rivera-Martinez

(57) ABSTRACT

A system and a method are provided for analyzing an image of an aortic valve structure to enable assessment of aortic valve calcifications. The system comprises an image interface for obtaining an image of an aortic valve structure, the aortic valve structure comprising aortic valve leaflets and an aortic bulbus. The system further comprises a segmentation subsystem for segmenting the aortic valve structure in the image to obtain a segmentation of the aortic valve structure. The system further comprises an identification subsystem for identifying a calcification on the aortic valve leaflets by
(Continued)

analyzing the image of the aortic valve structure. The system further comprises an analysis subsystem configured for determining a centerline of the aortic bulbus by analyzing the segmentation of the aortic valve structure, and for projecting the calcification from the centerline of the aortic bulbus onto the aortic bulbus, thereby obtaining a projection indicating a location of the calcification as projected onto the aortic bulbus. The system further comprises an output unit for generating data representing the projection. Provided information on the accurate location of calcifications after a valve replacement may be advantageously used, for example, to effectively analyze the risk of paravalvular leakages of Transcatheter aortic valve implantation (TAVI) interventions for assessing the suitability of a patient for TAVI procedure.

15 Claims, 7 Drawing Sheets

(51) Int. Cl.
  *G06T 19/00* (2011.01)
  *G06T 15/10* (2011.01)
  *G06T 7/00* (2017.01)

(52) U.S. Cl.
  CPC ............ *G06T 2207/10072* (2013.01); *G06T 2207/30048* (2013.01); *G06T 2207/30101* (2013.01); *G06T 2207/30172* (2013.01); *G06T 2210/41* (2013.01); *G06T 2215/08* (2013.01); *G06T 2219/021* (2013.01)

(58) Field of Classification Search
  CPC ........... G06T 7/246; G06T 2207/10072; G06T 2207/30172; G06T 2207/10016; G06T 2207/10081; G06T 17/00; G06T 2210/41; G06K 2209/057
  See application file for complete search history.

(56) References Cited

U.S. PATENT DOCUMENTS

| | | | | |
|---|---|---|---|---|
| 2006/0020327 | A1* | 1/2006 | Lashinski | A61B 17/0644 623/1.25 |
| 2010/0092053 | A1* | 4/2010 | Manabe | G06K 9/4638 382/128 |
| 2011/0255755 | A1 | 10/2011 | Shirahata et al. | |
| 2012/0207365 | A1* | 8/2012 | Verstraeten | G16H 50/50 382/128 |
| 2012/0243760 | A1* | 9/2012 | Manabe | G06T 7/0012 382/131 |
| 2013/0009958 | A1* | 1/2013 | Kitamura | A61B 6/032 345/424 |
| 2013/0066197 | A1* | 3/2013 | Pruvot | G06T 7/0012 600/427 |
| 2013/0155064 | A1* | 6/2013 | Grbic | A61B 5/055 345/420 |
| 2013/0208955 | A1* | 8/2013 | Zhao | G06F 19/321 382/128 |
| 2013/0230225 | A1* | 9/2013 | Waechter-Stehle | A61B 6/463 382/131 |
| 2014/0161331 | A1* | 6/2014 | Cohen | G06T 5/003 382/128 |
| 2014/0183374 | A1* | 7/2014 | Sakaguchi | A61B 6/12 250/394 |
| 2014/0221823 | A1* | 8/2014 | Keogh | A61N 7/02 600/424 |
| 2014/0296962 | A1* | 10/2014 | Cartledge | A61F 2/243 623/1.12 |
| 2014/0369465 | A1* | 12/2014 | Meyer | A61B 6/487 378/42 |
| 2015/0097833 | A1* | 4/2015 | Razeto | G06T 7/0012 345/424 |
| 2016/0038246 | A1* | 2/2016 | Wang | G06T 7/73 600/429 |

OTHER PUBLICATIONS

Delgad et al., Automated Assessment of the Aortic Root Dimensions With Multidetector Row Computed Tomography, 2011, Ann Thorac Surg 2011;91:716-23.*
Deschamps T. "Curve and Shape Extraction with Minimal Path and Level-Sets Techniques—Applications to 3D Medical Imaging", University Paris-IX Dauphine, Dec. 2001.
Zegdi, R. et al., "Is it reasonable to treat all calcified stenotic aortic valves with a valved stent?" Journal of the American College of Cardiology, New York, vol. 51, No. 5, 2008, pp. 579-584.
Capelli, C. et al., "Patient-specific simulations of transcatheter aortic valve stent implantation", Medical & Biological Engineering & Computing, Springer, Berlin, DE, vol. 50, No. 2, 2012, pp. 183-192.
Russ, C. et al., "Simulation of transcatheter aortic valve implantation under consideration of leaflet calcification", Conf Proc IEEE Eng Med Biol Soc. 2013;2013:711-4.
Grbic, S. et al., "Advanced intervention planning for transcatheter aortic valve implantations (TAVI) from CT using volumetric models", Biomedical Imaging (ISBI), 2013 IEEE 10th International Symposium on Apr. 7-11, 2013.
Bapat, V.N. et al., "Distribution of calcium in the ascending aorta in patients undergoing transcatheter aortic valve implantation and its relevance to the transaortic approach". JJACC: Cardiovascular Interventions, vol. 5, No. 5, May 2012, pp. 470-476.
Science & Enterprise, http://sciencebusiness.technewslit.com/?p=2349.

\* cited by examiner

ANALYZING AORTIC VALVE CALCIFICATION

CROSS-REFERENCE TO PRIOR APPLICATIONS

This application is the U.S. National Phase application under 35 U.S.C. § 371 of International Application Serial No. PCT/EP2015/070779, filed on Sep. 11, 2015, which claims the benefit of European Patent Application No. 14184516.4, filed on Sep. 12, 2014. These applications are hereby incorporated by reference herein.

FIELD OF THE INVENTION

The invention relates to a system and a method for analyzing an image of an aortic valve structure to enable assessment of aortic valve calcifications. The invention further relates to a workstation and imaging apparatus comprising the system, and to a computer program product comprising instructions for causing a processor system to perform the method.

BACKGROUND OF THE INVENTION

Narrowing of tubular cardiovascular structures such as heart valves may lead to non-physiological blood flows through the structures and consequently influence cardiovascular health of an individual. Valve calcification which is caused by calcium deposit, also known as plaque, on the valves may result in sclerosis (stiffening) of the tissue forming the valve leaflets and narrowing of the valve opening. This narrowing can progress to become severe enough to reduce blood flow through the aortic valve and to increase strain on the left ventricle, causing a valve stenosis (i.e. valve narrowing). The aortic valve is one of the heart valves with high prevalence of stenosis. The aortic valve stenosis is the second most common cardiovascular disease, having an incidence rate of 2-7% in the Western European and North American populations aged beyond 65 years. Ultimately, aortic valve stenosis may lead to symptoms including shortness of breath, chest discomforts and fainting. Left untreated, severe aortic stenosis can lead to death in up to 50 percent of patients.

Management of patients with aortic stenosis typically depends on the severity of the disease. When the aortic stenosis becomes severe, aortic valve replacement might be necessary. Transcatheter aortic valve implantation (TAVI) is the replacement of the aortic valve of the heart by a stent-based valve mounted on a catheter inserted into the body via a small incision, as opposed to valve replacement by open heart surgery. The TAVI procedure involves accessing a femoral artery, performing balloon valvuloplasty, then advancing an artificial aortic valve across the native valve using a catheter. During rapid right ventricular pacing, a balloon is inflated to deploy the artificial valve. Strokes can be a major complication during TAVI procedures. Embolization risk due to plaque rupture and paravalvular leakages, in which blood flows through a channel between the structure of the implanted valve and the cardiac tissue due to a lack of appropriate sealing, are drawbacks of TAVI interventions. Calcification assessment can be used for assessing the suitability of a patient for TAVI procedure, as well as for risk assessment, positioning of an aortic valve implant, and selection of a type of aortic valve implant.

In the assessment of calcifications, apart from the amount of calcification also its distribution is important. It has been shown that the distribution of the plaque load over the three aortic valve leaflets, also known as valve cusps (left coronary cusp (LCC), right coronary cusp (RCC), and non-coronary cusp (NCC)), is often asymmetric. The unequal distribution of calcifications is one risk factor for paravalvular leakage.

It is known to automatically evaluate aortic valve calcification. For example, in US 2013/155064 a method and system for automatic aortic valve calcification evaluation is described. According to US 2013/155064 a patient-specific aortic valve model in a 3D medical image volume, such as a 3D computed tomography (CT) volume is provided. Calcifications in a region of the 3D medical image volume are defined based on the aortic valve model. A 2D calcification plot is generated that shows locations of the segmented calcifications relative to aortic valve leaflets of the patient-specific aortic valve model. It is said that the 2D calcification plot can be used for assessing the suitability of a patient for a Transcatheter Aortic Valve Replacement (TAVI) procedure, as well as risk assessment, positioning of an aortic valve implant, and selection of a type of aortic valve implant. A problem of the method of US 2013/155064 is that it is insufficiently accurate for the assessment of aortic valve calcifications.

SUMMARY OF THE INVENTION

It would be advantageous to have a system or method for providing a more accurate assessment of aortic valve calcifications.

To better address this concern, a first aspect of the invention provides a system for analyzing an image of an aortic valve structure to enable assessment of aortic valve calcifications, the system comprising:

an image interface for obtaining an image of an aortic valve structure, the aortic valve structure comprising aortic valve leaflets and an aortic bulbus;

a segmentation subsystem for segmenting the aortic valve structure in the image to obtain a segmentation of the aortic valve structure;

an identification subsystem for identifying a calcification on the aortic valve leaflets by analyzing the image of the aortic valve structure;

an analysis subsystem configured for:

i) determining a centerline of the aortic bulbus by analyzing the segmentation of the aortic valve structure;

ii) projecting the calcification from the centerline onto the aortic bulbus, thereby obtaining a projection indicating a location of the calcification as projected onto the aortic bulbus;

an output unit for generating data representing the projection, wherein the image of the aortic valve structure is a three-dimensional image, thereby obtaining as the projection a three-dimensional projection.

In a further aspect of the invention, a method is provided for analyzing an image of an aortic valve structure to enable assessment of aortic valve calcifications, the method comprising:

obtaining an image of an aortic valve structure, the aortic valve structure comprising aortic valve leaflets and an aortic bulbus;

segmenting the aortic valve structure in the image to obtain a segmentation of the aortic valve structure;

identifying a calcification on the aortic valve leaflets by analyzing the image of the aortic valve structure;

determining a centerline of the aortic bulbus by analyzing the segmentation of the aortic valve structure;

projecting the calcification from the centerline onto the aortic bulbus, thereby obtaining a projection indicating a location of the calcification as projected onto the aortic bulbus;

generating data representing the projection, wherein the image of the aortic valve structure is a three-dimensional image, thereby obtaining as the projection a three-dimensional projection.

The above measures involve obtaining an image of an aortic valve structure of a patient, the aortic valve structure comprising aortic valve leaflets and an aortic bulbus. The image, formed by image data, may be, e.g., a volumetric image, or may be constituted by a stack of image slices, and may be acquired by various imaging modalities such as CT and Magnetic Resonance Imaging (MRI).

Here, the term 'aortic bulbus', also known as "aortic bulb" refers to an anatomical structure which at least includes the dilated first part of the aorta containing the aortic semilunar valves and the aortic sinuses. As such, a projection onto the aortic bulbus refers to projection on a wall of this anatomical structure.

A segmentation subsystem is provided for segmenting the aortic valve structure in the image by analyzing the image data, thereby obtaining a segmentation of the aortic valve structure. Segmentation of anatomical structures in images is well known. For example, a deformable model may be applied to the image data. Such type of segmentation is an example of model-based segmentation. Other types of segmentations may be used as well such as thresholding, clustering or region-growing.

Furthermore, an identification subsystem is provided for identifying one or more calcifications on the aortic valve leaflets by analyzing the image of the aortic valve structure, i.e. its image data. Various image analysis methods such as object detection techniques may be used for the identification of the calcification. The identification subsystem may be configured for using, e.g., intensity thresholding or segmentation methods to identify and/or segment a calcification. As such, the identification subsystem may provide information on the location of the calcification in the image.

In addition, an analysis subsystem is provided which is configured for determining a centerline of the aortic bulbus by analyzing the segmentation of the aortic valve structure. The centerline of the aortic bulbus may be determined by know methods for determining a centerline of a tubular cardiovascular structure. The analysis subsystem is further configured for projecting the calcification in a projection direction which runs from the centerline of the aortic bulbus towards a wall of the aortic bulbus structure. By performing the projection, the analysis subsystem provides information about a location of the calcification as projected onto the aortic bulbus structure.

The present invention is based on the insight that the positioning and frame expansion of a stent after the valve replacement may result in redistribution of calcifications. For example, the insertion and the expansion of the stent in an aortic valve may press a valve leaflet and a calcification attached to the leaflets against the bulbus wall. In other words, the original valve leaflets are always pressed onto the aortic bulbus by the insertion and the expansion of the stent-based valve. The redistributed location of a calcification may interfere with the complete and symmetrical frame expansion of the stent after the valve replacement. An identification of the location of the calcification after the valve replacement is therefore advantageous. By performing the projection, the invention provides useful information on the redistribution of calcifications after such positioning and frame expansion of a stent and the valve replacement. The provided information may be advantageously used, for example, to effectively analyze the risk of paravalvular leakages of TAVI interventions for assessing the suitability of a patient for TAVI procedure. Information on the location of calcification as projected onto the aortic bulbus may also be advantageously used for planning the positioning of an aortic valve implant, the selection of a type of aortic valve implant, etc.

Here, the term "projection" refers to a general term or collective term for a class of different concrete mathematical functions. There are two main types of projection performed by the analysis subsystem, namely orthogonal projection and so called "corrected" projection. Here, the corrected projection indicate the projection is in a direction other than the orthogonal direction. The types of projection is determined based on several decision criterions by the analysis subsystem. One example of the decision criterion to select the type of projection may be based on the status of the aortic valve leaflets. Another example of decision criterion may be based on the intention of the application, e.g. forecast calcium distribution in the aortic bulbus after TAVI in order to forecast paravalvular leakage, or merely have an optical measure for the asymmetric distribution of the plaque load over the three valve leaflets. It is understood that other criteria may also be possible.

The aortic valve leaflets normally have two extreme states: an open state and a close state. It is understood that intermediate states are also possible. After the valve replacement, the stent of the stent-based valve will have crashed the original valve and has pressed the original valve leaflets onto the aortic bulbus. Hence, when the aortic valve leaflets are in an open state, by projecting the calcification in an orthogonal direction from the centerline onto the aortic bulbus, the projected calcification in the aortic bulbus will sufficiently reflect the distribution of the calcification after the valve replacement, namely after the insertion of the stent-based valve.

Advantageously, the orthogonal projection can be easily implemented and may provide sufficient information in a fast manner, which enables the physician to quickly determine in advance whether the calcification between the aortic bulbus and the inserted stent may cause any leakage. Therefore, the orthogonal projection may be used when the original valve is imaged in an open state, and/or in a situation when the user may only need rough information for the location of the projected calcification.

The insertion of the stent-based valve will change the position of the original valve leaflets by crashing the valve and, consequently, will change the position of the projected calcification in the aortic bulbus. In order to precisely determine the location of the projected calcification, the direction of the projection needs to be changed or corrected to a direction other than the orthogonal direction from the centerline onto the aortic bulbus, especially when the original valve was imaged in a close state. The direction of the projection will be determined by performing the following steps: determining a plane containing the centerline and the calcification, wherein the plane is intersected with the annulus at an annulus intersection point, with the aortic bulbus at a first curve and with the valve leaflet at a second curve; determining a distance from the calcification to the annulus intersection point along the second curve; projecting the calcification in a projection direction onto the aortic bulbus to obtain a projected calcification based on the distance from the calcification to the annulus intersection point; wherein the projection direction is determined such that, after the projection, the distance from the projected calcification to the annulus intersection point along the first curve is the same as the distance from the annulus intersection point to the calcification along the second curve. Advantageously, the corrected projection may provide accurate and detailed information for the location of the projected calcification which enables the physician to precisely determine in advance whether the calcification between the aortic bulbus and the inserted stent may cause any leakage. Therefore, the corrected projection may be used when the original valve is imaged in a close state, and/or in a situation when the user may need accurate and detailed information for the location of the projected calcification.

Optionally, the image of the aortic valve structure is a three-dimensional image, thereby obtaining as the projection a three-dimensional projection, and the analysis subsystem is further configured for unfolding the three-dimensional projection, thereby obtaining a two-dimensional plot indicating the location of the calcification as projected onto the aortic bulbus. A two-dimensional plot may be interpreted easier and/or more accurately than a three-dimensional image. This is advantageous in that it facilitates the assessment of the distribution of calcifications in the aortic valve structure by a clinician.

Optionally, the analysis subsystem is further configured for indicating at least one of: a left coronary cusp sector, a right coronary cusp sector, a non-coronary cusp sector, annulus and coronary ostia, in the two-dimensional plot. This facilitates the detection of a symmetric or an asymmetric distribution of the calcification with respect to the aortic valve leaflets by a clinician. For example, a clinician can directly see the location of the calcification with respect to the left coronary cusp sector and the right coronary cusp sector.

Optionally, the analysis subsystem is configured for projecting the calcification in an orthogonal direction from the centerline onto the aortic bulbus. Such projection in the orthogonal direction indicates a location of the calcification as projected onto the aortic bulbus. Advantageously, the projection in the orthogonal direction may already provide a clinician with approximate information on a symmetric or an asymmetric distribution of the calcification with respect to the aortic valve leaflets. The above measures enable the system, for example, to sufficiently simulate a location of the calcification after a stent-based valve is inserted into the aortic valve structure when the image of the aortic valve structure is obtained in an open state of the aortic valve in a corresponding heart cycle.

Optionally, the aortic valve structure in the image comprises an annulus of the aortic valve, and the analysis subsystem is configured for determining a plane containing the centerline and the calcification, wherein the plane is intersected with the annulus at an annulus intersection point, with the aortic bulbus at a first curve and with the valve leaflet at a second curve; determining a distance from the calcification to the annulus intersection point along the second curve; projecting the calcification in a projection direction onto the aortic bulbus to obtain a projected calcification based on the distance from the calcification to the annulus intersection point such that, after the projection, the distance from the projected calcification to the annulus intersection point along the first curve is the same as the distance from the annulus intersection point to the calcification along the second curve. The above measures enable the system to simulate an accurate location of the calcification after a stent is inserted into the aortic valve structure when the image of the aortic valve structure is obtained in a close state of the aortic valve in a corresponding heart cycle.

Optionally, the identification subsystem is further configured for determining an amount of the calcification on the aortic valve leaflets by analyzing the image of the aortic valve structure, and the analysis subsystem is further configured for indicating the amount of the calcification in the projection. Taking the amount of the calcification into account provides further information for an assessment of a symmetric or an asymmetric distribution of the calcification with respect to the aortic valve leaflets. This may facilitate the assessment by a clinician.

Optionally, the analysis subsystem is further configured for quantifying a distribution of calcifications in the aortic valve structure by analyzing the location and the amount of the calcifications, and the output unit is further configured for generating data representing the quantification of the distribution of the calcifications in the aortic valve structure. For example, the data may represent a table indicating a percentage of the calcification located on each of the aortic valve leaflets. Such data of the quantification of the distribution of the calcifications is advantageous in that such quantitative data may be interpreted easier and/or more accurately compared to a case when a clinician has to interpret the data qualitatively based on the information visualized to the clinician.

Optionally, the aortic valve structure in the image further comprises an ascending aorta and a left ventricle, and the identification subsystem is further configured for identifying a calcification on the ascending aorta or the left ventricle by analyzing the image of the aortic valve structure, and the analysis subsystem further indicates a location of the calcification on the ascending aorta or the left ventricle in the projection. The ascending aorta and the left ventricle may provide further anatomical context, thereby facilitating the detection of the location of the calcification with respect to the ascending aorta and/or the left ventricle by a clinician. Also, based on the distribution of the calcifications, placement of an stent may result in a repositioning of a calcification on the ascending aorta and/or the left ventricle. Accordingly, the system is enabled to show such repositioning of the calcification on the ascending aorta and/or the left ventricle.

Optionally, the segmentation subsystem is configured for performing a model-based segmentation of the image by applying a model to the image data. For example, the model maybe a deformable model. In an example, the deformable model may be a mean shape model representing a mean shape of a cardiovascular structure across a plurality of patients, or a patient adapted model adapted for the cardiovascular structure of a patient. As such, the deformable model may define a geometry of the type of cardiovascular structure, e.g., as a multi-compartmental mesh of triangles, in particular one which models the substructures of such cardiovascular structures. The deformable model may be represented by model data. With such a model-based segmentation, advantageously, the pre-interventional anatomy of the aortic bulbus including the annulus and the valve leaves may be segmented during different phases of the heart cycle.

Optionally, the model encodes at least one of: a left coronary cusp sector, a right coronary cusp sector, a non-coronary cusp sector, an annulus and a coronary ostia. This may facilitate the marking of these sectors in an unfolded two-dimensional plot if such a plot is provided by the system.

Optionally, the image of the aortic valve structure is a CT image and the identification subsystem is configured for determining the calcification by performing an intensity thresholding of the CT image. In case of CT images, the calcification may be advantageously seen on uncontrasted images since in contrast enhanced images the contrast agent has a similar intensity value as the calcifications and can falsify the calcium score.

Optionally, the image is a spectral computed tomography image as obtained from, for example, Philips' IQon Spectral Computed Tomography scan, and the identification subsystem is configured for determining the calcification by performing a spectral analysis to identify the calcification based on a characterized atomic number of the calcification material. Using such material-based characterization of the calcifications, a more accurate identification of the shape and size of a calcification may be obtained.

In a further aspect of the invention, a computer program product is provided comprising instructions for causing a processor system to perform the method.

A further aspect of the invention provides a workstation or imaging apparatus comprising the system. Accordingly, the workstation or imaging apparatus may each comprise the image interface, the segmentation subsystem, the identification subsystem and the analysis subsystem.

It will be appreciated by those skilled in the art that two or more of the above-mentioned embodiments, implementations, and/or aspects of the invention may be combined in any way deemed useful.

Modifications and variations of the imaging apparatus, the workstation, the method, and/or the computer program product, which correspond to the described modifications and variations of the system, can be carried out by a person skilled in the art on the basis of the present description.

A person skilled in the art will appreciate that the method may be applied to multi-dimensional image data, e.g., to three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

Figure 1:
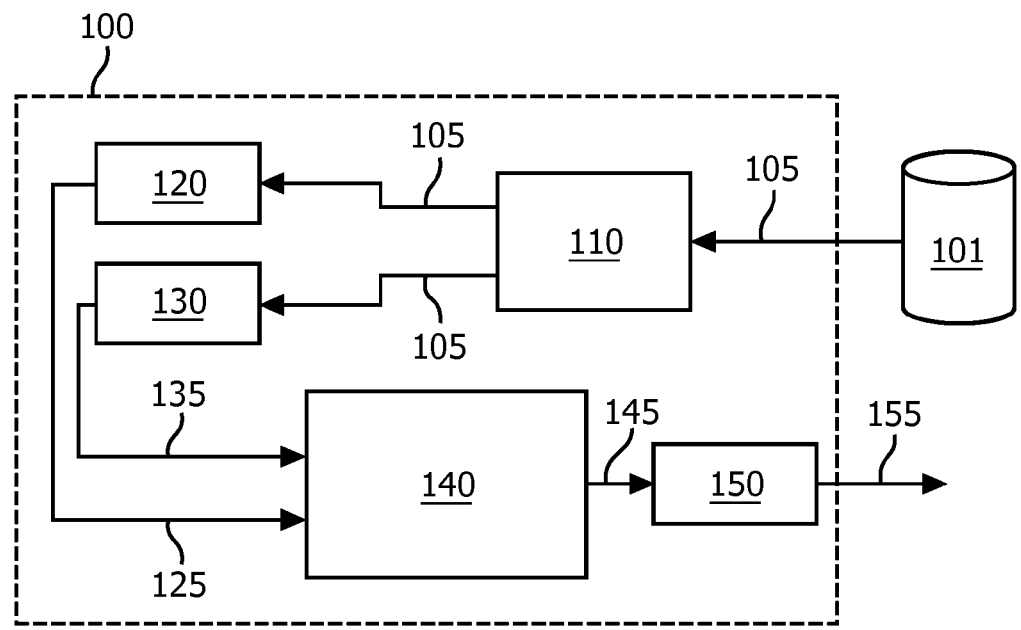
FIG. 1 shows a system for analyzing an image of an aortic valve structure to enable assessment of calcifications.

FIG. 1 shows a system 100 for analyzing an image of an aortic valve to enable assessment of aortic valve calcifications. The system 100 comprises an image interface 110 for obtaining an image 105 of an aortic valve structure, the aortic valve structure comprising aortic valve leaflets and an aortic bulbus. FIG. 1 shows the image interface 110 obtaining the image 105 in the form of image data 105 from an external database 101, such as a Picture Archiving and Communication System (PACS). As such, the image interface 110 may be constituted by a so-termed DICOM interface. However, the image interface 110 may also take any other suitable form, such as an internal or external memory or storage interface, a network interface to local or wide area network, etc. For example, instead of accessing the image from an external database, the image may be accessed from an internal memory.

The system 100 further comprises a segmentation subsystem 120. The segmentation subsystem 120 is configured for, during operation of the system 100, segmenting the aortic valve structure in the image to obtain a segmentation of the aortic valve structure. For that purpose, the segmentation subsystem 120 is shown to obtain the image 105 via the image interface 110, and to output segmentation data 125 representing the segmentation of the aortic valve structure.

The system 100 further comprises an identification subsystem 130. The identification subsystem 130 is configured for, during operation of the system 100, identifying a calcification on the valve leaflets by analyzing the image of the aortic valve structure. For that purpose, the identification subsystem 130 is shown to obtain the image 105 via the image interface 110, and to provide identification data 135 representing a result of the identification. For example, the identification subsystem 130 may be configured to provide data indicating a location, shape, size and/or other characteristics of a calcification such as material characteristics of the calcification. Although not shown in FIG. 1, the identification subsystem 130 may exchange data with the segmentation subsystem 120. For example, the segmentation subsystem may send data representing a segmented aortic valve structure to the identification subsystem and the identification subsystem may receive the data and use the data to perform a registration of the segmented aortic valve structure to other data.

The system 100 further comprises an analysis subsystem 140. The analysis subsystem 140 is configured for, during operation of the system 100, i) determining a centerline of the aortic bulbus by analyzing the segmentation of the aortic valve structure, and ii) projecting the calcification from the centerline onto the aortic bulbus, thereby obtaining a projection indicating, a location of the calcification as projected onto the aortic bulbus. The analysis subsystem 140 is further configured to provide data 145 representing a result of its analysis. The analysis subsystem 140 may make the data 145 available within the system 100, e.g. for further analysis or output.

The system 100 may further comprise an output unit 150. The output unit may be configured for, during operation of the system 100, generating output data. For example, the output unit may provide the output data by formatting the data 145 which it receives from the analysis subsystem 140. The result of the output unit 155 may be used in further analysis, visualization, etc. For example, the output unit may be a display output and the output data may be display data to be visualized on a display connected to the display output.

The system 100 may be embodied as, or in, a single device or apparatus, such as a workstation or imaging apparatus. The device or apparatus may comprise one or more microprocessors which execute appropriate software. The software may have been downloaded and/or stored in a corresponding memory, e.g., a volatile memory such as RAM or a non-volatile memory such as Flash. Alternatively, the functional units of the system may be implemented in the device or apparatus in the form of programmable logic, e.g., as a Field-Programmable Gate Array (FPGA). It is noted that the system 100 may also be implemented in a distributed manner, i.e., involving different devices or apparatuses.

Figure 2:
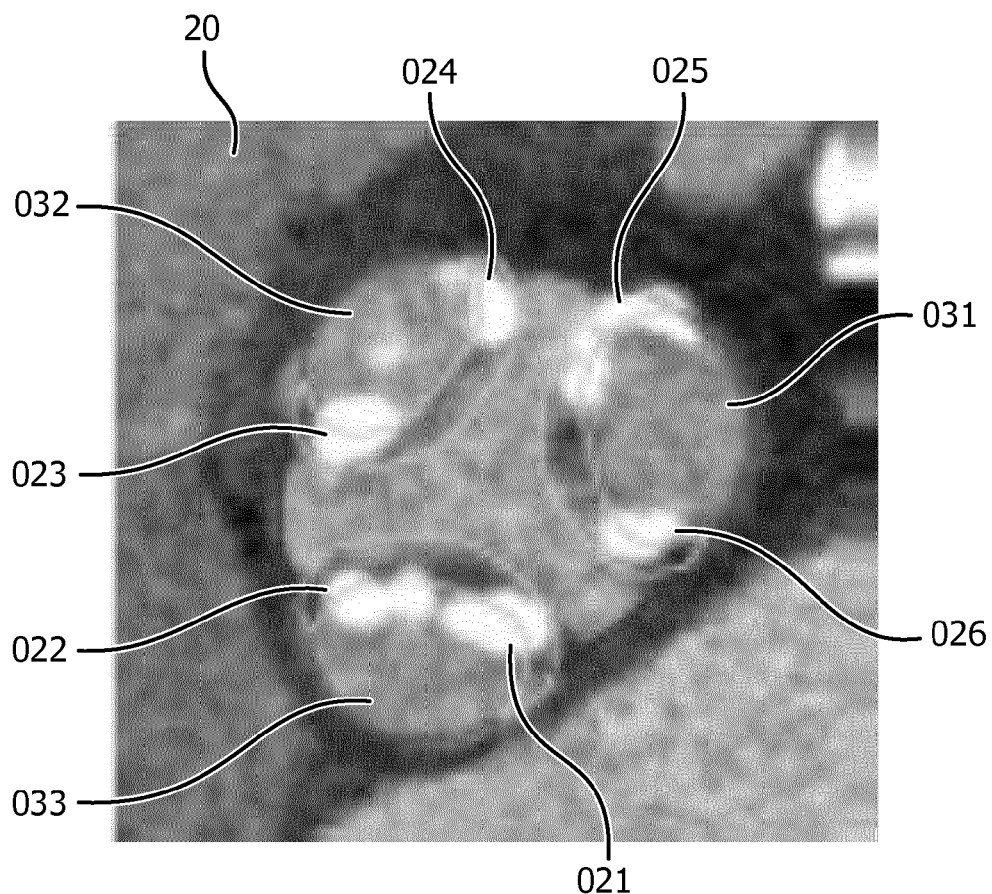
FIG. 2 shows a segmentation of aortic valves leaflets, and calcifications of the aortic valve leaflets in the form of white areas.

FIG. 2 shows an image 20 illustrating a result of the segmentation subsystem 120 of the system 100 of the FIG. 1. An aortic valve structure comprising a first leaflet 031, a second leaflet 032 and a third leaflet 033 is illustrated in the image 20. The boundary of the leaflets 031-033 are illustrated by curved lines in the image 20. The boundary of the leaflets 031-033 are obtained as a result of the segmentation performed by the segmentation subsystem. Furthermore, the image 20 further illustrates calcifications 021-026 on the leaflets 031-033.

The image of the aortic valve structure may be acquired by imaging modalities such as CT and MRI. In another example, the image of the aortic valve structure may be acquired by Computed Tomography Angiography. Computed Tomography Angiography is a special kind of CT that focuses particularly on the blood vessels and heart valves, using a contrast material to make them show up clearly in the images. In another example, the image of the aortic valve structure may be acquired by spectral computed tomography which may deliver not only anatomical information but also the ability to characterize structures based on their material makeup within a single scan. Using a type of spectral analysis, the system 100 of the FIG. 1 may be configured for separating out materials made up of specific atomic numbers off the periodic chart of elements. Elements can be assigned specific color codes to make them standout on scans, even if the surrounding tissue has similar Hounsfield unit numbers. Spectral analysis may be used to identify calcifications on the aortic valve structures.

A combination of a contrasted image and an uncontrasted image of the aortic valve structure may be used in the system 100 of the FIG. 1. In an example, the aortic valve structure may be segmented in the contrasted image and the calcification may be identified in the uncontrasted image. By a model-based registration, the segmented aortic valve structure may be registered to the uncontrasted image. To apply such registration, a boundary detection or features of a second model may be trained on the uncontrasted image by limiting an adaptation to a translation and a rotation.

The identification subsystem 130 of the system 100 of FIG. 1 may be configured for different types of intensity thresholding of the image data to identify the calcifications. In an example, a first threshold may be determined. This first threshold may be used to evaluate the image intensity values on a model surface, for example leaflet model surface, by thresholding. Using this method a number of seed points may be determined. A region growing may be applied for the seed points. For the region growing a second threshold may be determined. For neighboring voxels, thresholding may be applied using the second threshold. For noise reduction, not an intensity value of a voxel itself, but an average value of the neighboring voxels may be used. In another example, a native calcium-score scan may be used for identification of the calcifications. The native calcium-score scan and, for example, Computed Tomography Angiography scan may be registered for further analysis.

Figure 3A:
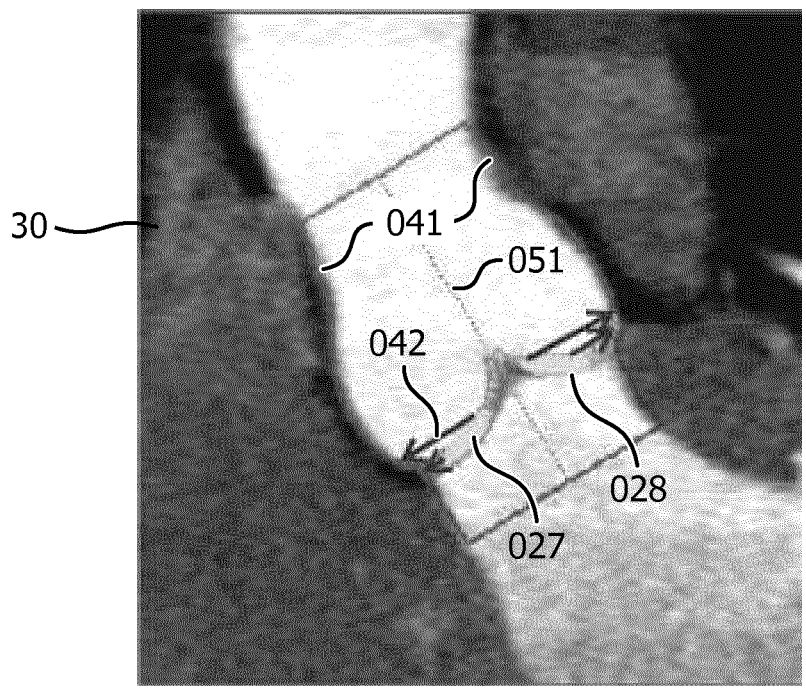
FIG. 3A shows an image of aortic valve structure, illustrating calcifications as a result of an identification performed by the identification subsystem.

FIG. 3A shows an image 30 of an aortic valve structure illustrating calcifications 027-028 as a result of an identification performed by the identification subsystem 130. Furthermore, FIG. 3A shows a centerline 051 of the aortic bulbus 041 determined by the analysis subsystem 140 of the system 100 of FIG. 1. Furthermore, FIG. 3A illustrates an orthogonal projection direction 042 from the centerline 051 to the aortic bulbus 041.

The analysis subsystem 140 of the system 100 of FIG. 1 may be configured to determine the centerline 051 of the aortic bulbus 041, for example, by applying a centerline extraction algorithm based on Deschamps T., "Curve and Shape Extraction with Minimal Path and Level-Sets Techniques—Applications to 3D Medical Imaging", Université Paris-IX Dauphine, December 2001. In such approach, a partial front propagation algorithm may be used to divide volume voxels in the image of the aortic valve structure into "Alive" (vessel voxels), "Far" (untouched voxels) and "Trial" points depending on their image intensity. The "Trial" point set may be a surface in 3D which may be described as a rough segmentation of a boundary a tubular structure such as aortic bulbus. A second front propagation may propagate the front inward from all "Trial" points. This may lead to higher arrival times towards the center of the tubular structure. Consequently, a minimal path between start and end points relatively to the arrival times previously computed may be found by applying a front propagation for a third time. The front may be pushed to propagate faster in the center of the tubular structure. A centered path of the tubular structure may be obtained by back-propagation from the end point.

Figure 3B:
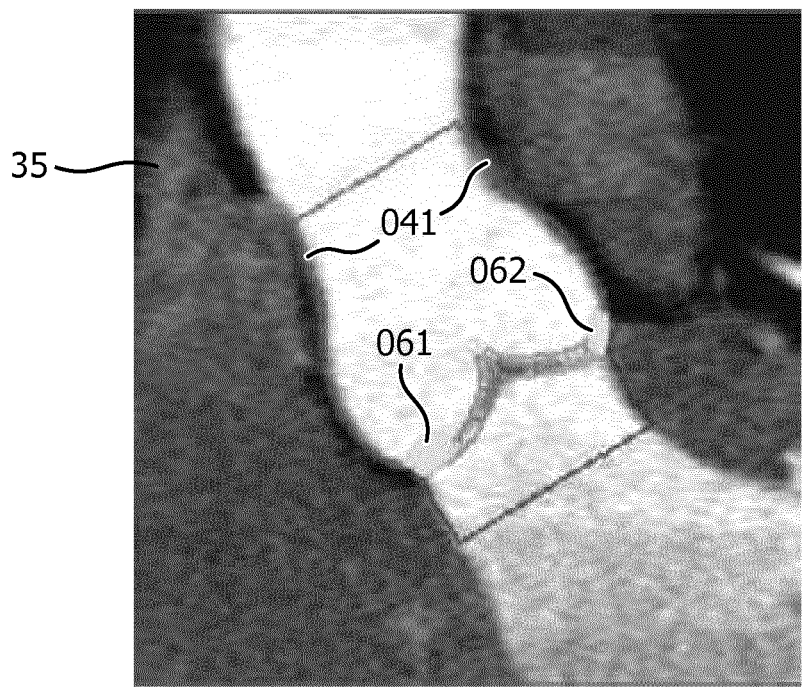
FIG. 3B shows an image of aortic valve structure illustrating a result of an orthogonal projection performed by the analysis subsystem.

FIG. 3B shows an image 35 of an aortic valve structure illustrating a result of a projection performed by the analysis subsystem 140 of the system 100 of FIG. 1. The image 35 illustrates projected calcifications 061-062 as projected onto the aortic bulbus 041. The projection may be a pixel-based projection. For example, a sum of pixels with a certain intensity at a certain point in an image may be projected to a specific distance from a projection line in a specific direction. For example, pixels representing the calcifications 027-28, may be projected from the centerline 051 onto the aortic bulbus 041 to obtain the projected calcifications 061-062 in an orthogonal direction from the centerline. To perform such projections, the analysis subsystem 140 of the system 100 of FIG. 1 may calculate a distance of a pixel from the centerline 051 of the aortic bulbus and from the bulbus wall.

Figure 4:
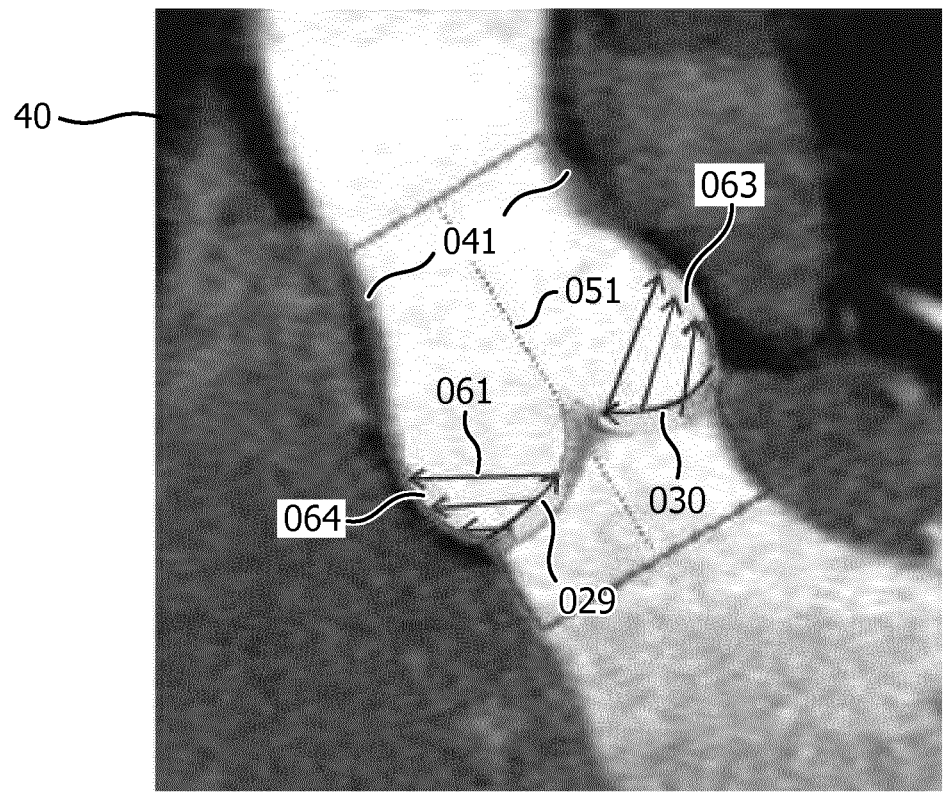
FIG. 4 shows an image of aortic valve structure illustrating a result of a corrected projection performed by the analysis subsystem.

FIG. 4 shows an image 40 of an aortic valve structure illustrating a result of a projection performed by the analysis subsystem 140 of the system 100 of FIG. 1. Furthermore, FIG. 4 illustrates calcifications 029-030 and the centerline 051 of the aortic bulbus 041. To accurately simulate the situation in which a stent is inserted into the aortic valve structure, the analysis subsystem 140 of the system 100 of FIG. 1 may be configured to perform a projection in a direction other than the orthogonal direction from the centerline. For that purpose, the analysis subsystem 140 may be configured for specifying a correction on the orientation of the projection. The correction may be specified based on a distance of the calcification to the annulus along the aortic valve leaflet. FIG. 4 further illustrates a corrected projection direction 043. Accordingly, the location of the projected calcification represents the location of the calcification in the situation in which a stent is placed in the valve. FIG. 4 illustrates the resulting projected calcification 063-064.

Figure 9A:
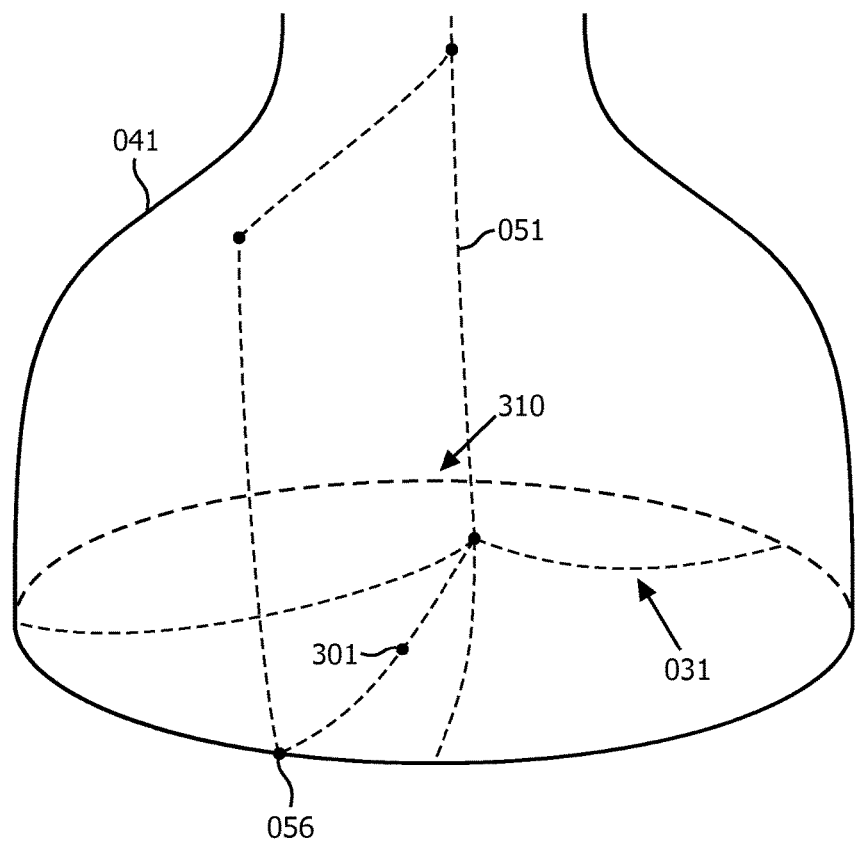
FIGS. 9A and 9B schematically show an example illustrating a result of a corrected projection performed by the analysis subsystem according to an embodiment of the present invention.
Figure 9B:
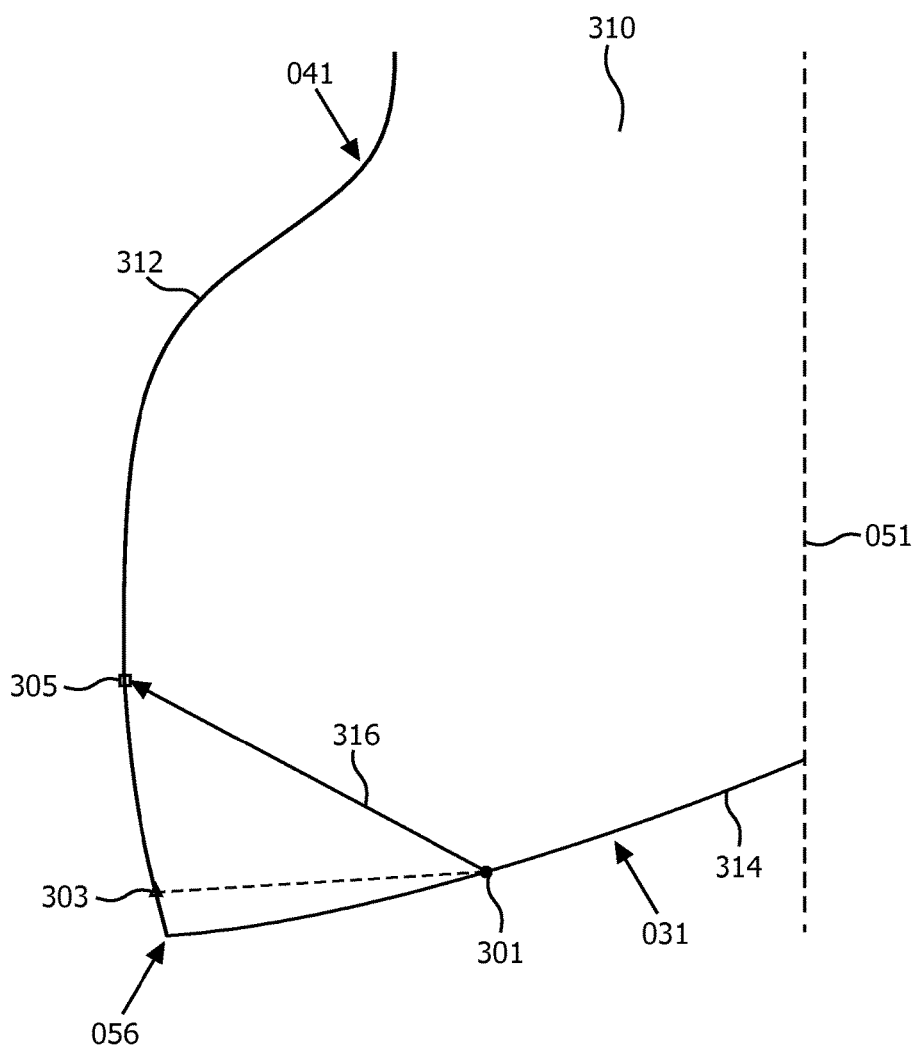

FIGS. 9A and 9B further schematically show an example illustrating a result of a corrected projection when the image of the aortic valve structure is obtained in a close state of the aortic valve in a corresponding heart cycle.

In FIG. 9A, a plane 310 is determined by including the centerline 051 of the aortic bulbus and an area 301 indicating the calcification in the aortic leaflet 031 within the plane 310. The plane 310 is intersected with the annulus at an annulus intersection point 056, with the aortic bulbus 041 at a first curve 312 (not shown in FIG. 9A) and with the aortic leaflet 031 at a second curve 314 (not shown in FIG. 9A).

In FIG. 9B, the area 301 with round shape indicates the calcification in the aortic leaflet 031. An area 303 with triangular shape indicates the projected calcification in the aortic bulbus 041 by using the orthogonal projection, namely by projecting the area 301 in an orthogonal direction from the centerline 051 onto the aortic bulbus 041. An area 305 with square shape indicates a projected calcification in the aortic bulbus 041 by using the corrected projection, namely by projecting the area 301 in a projection direction 316 from the centerline 051 onto the aortic bulbus 041. Note that the areas 301, 303, 305 and the annulus intersection point 056, as well as the first curve 312 and the second curve 314 are all located in the plane 310. As can be seen from FIG. 9B, the area 303 is lower than the area 305, which indicates that the insertion of the stent will change the position of the projected calcification in the aortic bulbus when the aortic valve is in a close state.

The projection of the calcification 301 in a projection direction onto the aortic bulbus 041 to obtain a projected calcification, namely the area 305, is based on the distance from the calcification 301 to the annulus intersection point 056. There are several ways to implement such projection. One option is to determine the projection direction 316 by the analysis subsystem 140 of the system 100 based on the following steps: determining a distance from the calcification 301 to the annulus intersection point 056 along the second curve 314; determining the projection direction 316 such that, after the projection, the distance from the projected calcification 305 to the annulus intersection point 056 along the first curve 312 is the same as the distance from the annulus intersection point 056 to the calcification 301 along the second curve 314. Based on the determined projection direction 316, the area 301 can be projected to the first curve 312 in order to obtain the projected calcification, namely the area 305. Note that the annulus intersection point 056 is also located on the first curve 312. Alternatively, the calcification 301 can be projected to the first curve 312 using the orthogonal projection in order to derive a rough position of the projected calcification, namely the area 303. Subsequently, the rough position of the projected calcification can be changed or corrected by the analysis subsystem 140 along the first curve 312 to a corrected position of the projected calcification, namely the area 305, such that the distance from the projected calcification 305 to the annulus intersection point 056 along the first curve 312 is the same as the distance from the annulus intersection point 056 to the calcification 301 along the second curve 314.

Figure 5:
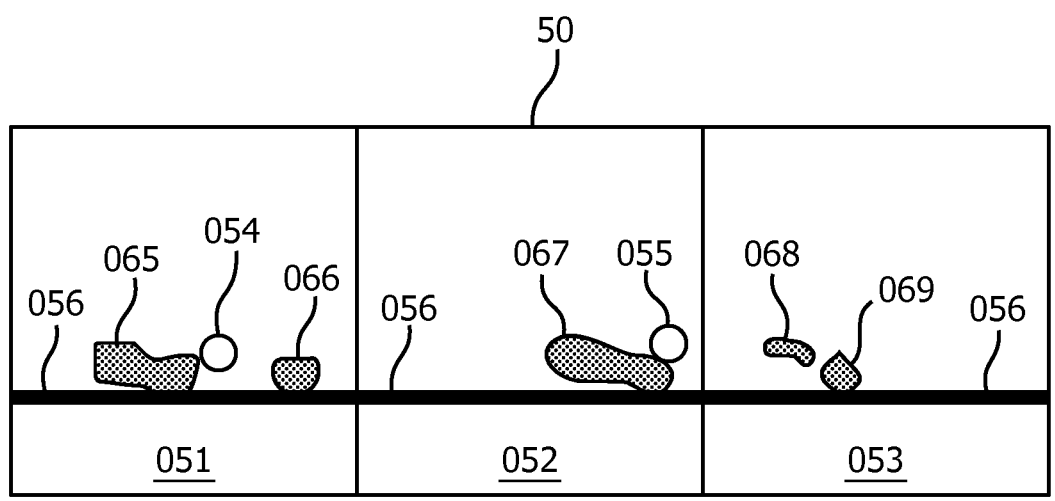
FIG. 5 shows a two-dimensional plot schematically representing an unfolded aortic bulbus.

FIG. 5 shows a two-dimensional plot 50 schematically representing an unfolded aortic valve structure. The plot may have been generated by the analysis subsystem 140 of the system 100 of FIG. 1 by unfolding the aortic valve structure. The location of the calcification as projected onto the aortic bulbus is illustrated in FIG. 5. Here, the two-dimensional plot 50 is divided into a left coronary cusp sector 051, a right coronary cusp sector 052 and a non-coronary cusp sector 053. In the left coronary cusp sector 051 a cross-section of a left coronary artery 054 is illustrated. In the right coronary cusp sector 052 a cross-section of a right coronary artery 055 is illustrated. Furthermore, annulus 056 is illustrated in the two-dimensional plot 50. The two-dimensional plot illustrates projected calcifications 065-069. The analysis subsystem 140 of the system 100 may be configured for performing the unfolding in the following manner. First, a cylindrical surface may be calculated for the aortic bulbus. Then, the cylindrical surface may be cut open and rolled open to a rectangular area in a plane. In this way, a complete and one-to-one unfolding of the aortic bulbus wall may be obtained. Finally, the details of the aortic bulbus wall may be visualized on the obtained planar representation by the use of surface shading or volume rendering.

The two-dimensional plot may be divided into a number of sectors. For example, the segmentation subsystem 120 of the system 100 of FIG. 1 may be configured for performing a model-based segmentation and for indicating desired sectors using a number of commissure points in a model. For example, three commissure points may be used to obtain three sectors. The commissure points may be encoded in a model of the aortic valve structure and, therefore, labeled in the image after the model-based segmentation.

Figure 6A:
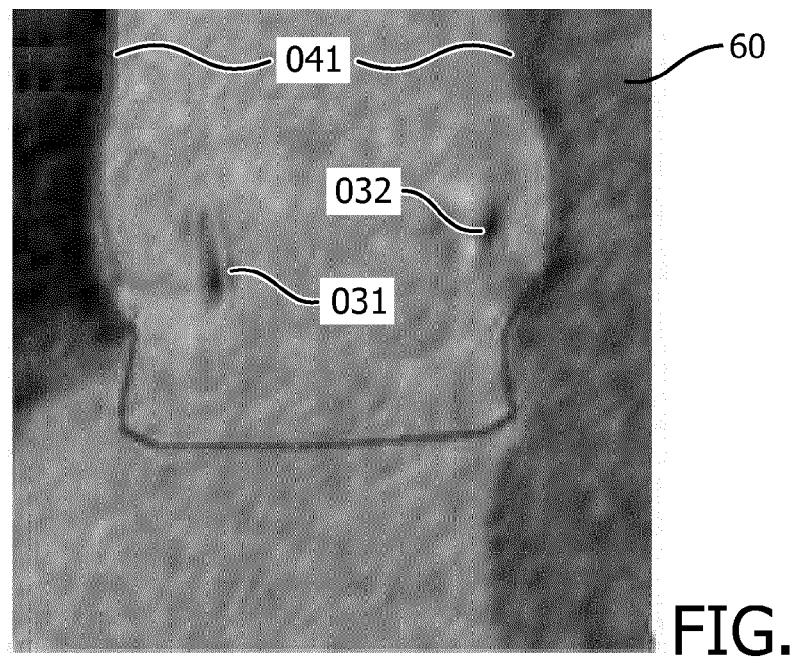
FIG. 6A shows segmentation of an image of an aortic valve structure.

FIG. 6A shows an image 60 of an aortic valve structure illustrating a result of a segmentation performed by the segmentation subsystem 120 of the system 100 of FIG. 1. A segmentation of the aortic bulbus 041 and two leaflets 031-032 of the three leaflets is illustrated in FIG. 6A.

Figure 6B:
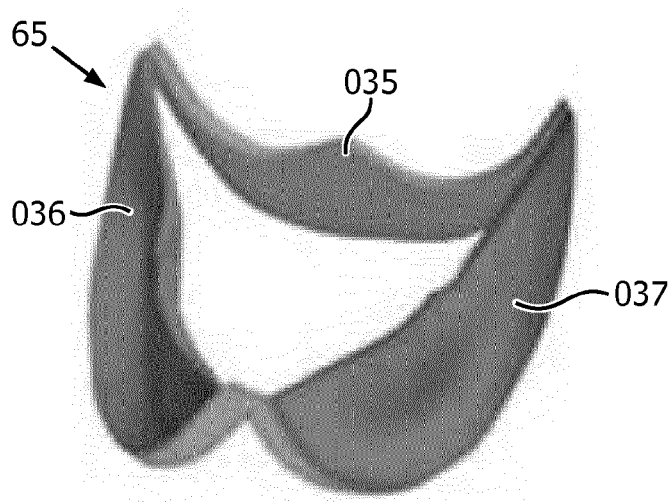
FIG. 6B shows a model of the aortic valve leaflets.
Figure 6C:
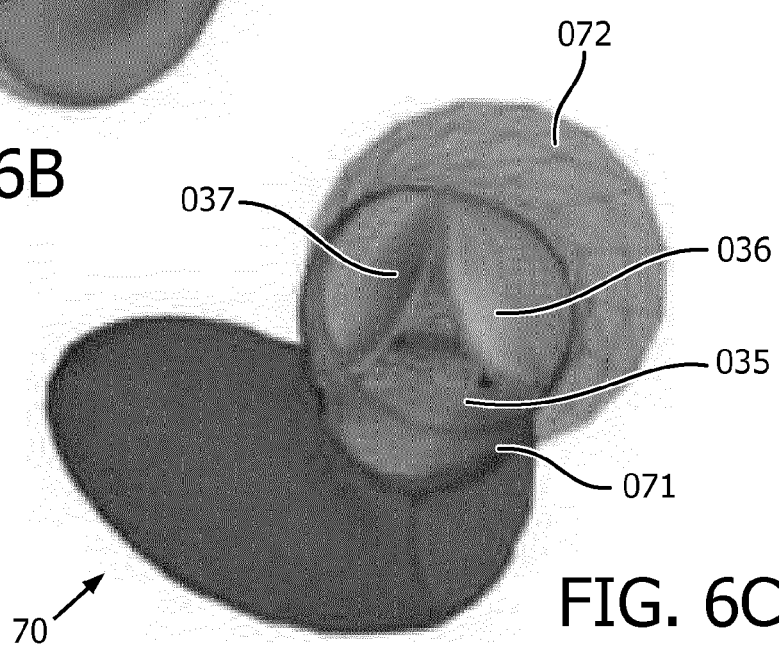
FIG. 6C shows a model of an aortic valve structure comprising aortic valve leaflets, a left ventricle, and an ascending aorta.

FIG. 6B shows a model 65 of the leaflets 035-037 which may be used in a segmentation performed by the segmentation subsystem 120. FIG. 6C shows a model 70 of the aortic valve structure comprising leaflets 035-037, ascending aorta 071 and left ventricle outflow 072. Including the ascending aorta and/or the left ventricle in the model 70 may be desirable for facilitating the detection of a location of a calcification with respect to the ascending aorta and/or the left ventricle by a clinician. Furthermore, based on the distribution of the calcifications, placement of an stent may result in a repositioning of a calcification onto the ascending aorta and/or the left ventricle. In this case, the projection may further indicate a location of the calcification as projected onto the ascending aorta or onto the left ventricle.

The model 65 of FIG. 6B and the model 70 of FIG. 6C may be obtained using a deformable model. For example, the deformable model may comprise a representation of a leaflet. The segmentation subsystem may be configured for fitting such a deformable model to the image data of the image to obtain a fitted model representing the segmentation of the leaflet. The applying of a deformable model to the image data of a medical image, also referred to as mesh adaptation in case of a mesh model, may involve optimizing an energy function which may be based on an external energy term which helps to adapt the deformable model to the image data and an internal energy term which maintains a rigidness of the deformable model. Deformable models of the above described type are known per se, as are methods of applying such models to an anatomical structure in a medical image. It is noted that, instead of deformable models, also other types of model-based segmentation may be used to obtain a segmentation of the aortic valve structure.

Figure 7:
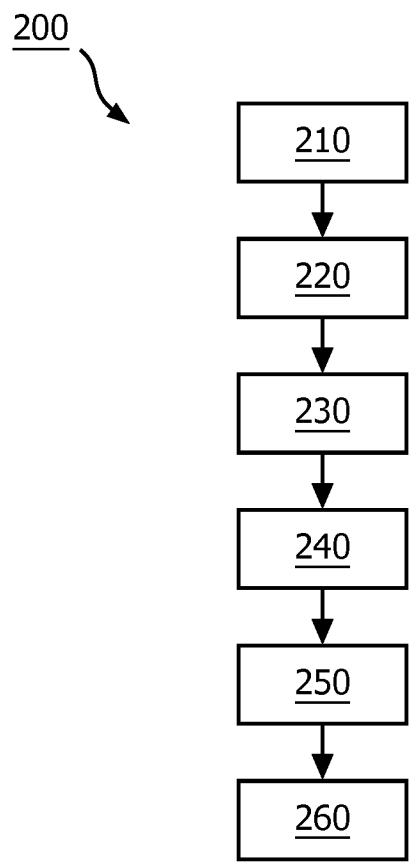
FIG. 7 shows a method for analyzing an image of an aortic valve structure to enable assessment of calcifications.

FIG. 7 shows a method 200 for analyzing an image of an aortic valve to enable assessment of aortic valve calcifications. The method 200 comprises, in an operation titled "OBTAINING IMAGE OF AORTIC VALVE STRUCTURE", obtaining 210 an image of an aortic valve structure, the aortic valve structure comprising aortic valve leaflets and an aortic bulbus. The method 200 further comprises, in an operation titled "SEGMENTING AORTIC VALVE STRUCTURE IN IMAGE", segmenting 220 the image to obtain a segmentation of the aortic valve structure. The method 200 further comprises, in an operation titled "IDENTIFYING CALCIFICATION", identifying 230 a calcification on the valve leaflets by analyzing the image of the aortic valve structure. The method 200 further comprises, in an operation titled "DETERMINING CENTERLINE OF AORTIC BULBUS", determining 240 a centerline of the aortic bulbus by analyzing the segmentation of the aortic valve structure. The method 200 further comprises, in an operation titled "PROJECTING THE CALCIFICATION", projecting 250 the calcification from the centerline onto the aortic bulbus, thereby obtaining a projection indicating a location of the calcification as projected onto the aortic bulbus. The method 200 further comprises, in an operation titled "GENERATING DATA", generating 260 data representing the projection.

Figure 8:
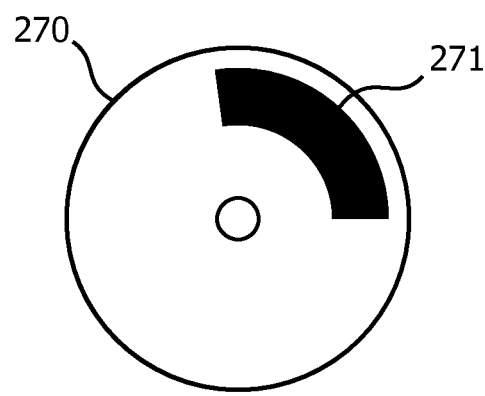
FIG. 8 shows a computer program product comprising instructions for causing a processor system to perform the method.

The method 200 may be implemented on a computer as a computer implemented method, as dedicated hardware, or as a combination of both. As illustrated in FIG. 8, instructions for the computer, i.e., executable code, may be stored on a computer program product 270, e.g., in the form of a series 271 of machine readable physical marks and/or as a series of elements having different electrical, e.g., magnetic, or optical properties or values. The executable code may be stored in a transitory or non-transitory manner. Examples of computer program products include memory devices, optical storage devices 270, integrated circuits, servers, online software, etc. FIG. 8 shows an optical disc.

It is noted that in general, aortic valve calcification may be caused by calcium deposits on the aortic valve in the heart. As a result, tissue forming the valve leaflets may become stiffer, narrowing the valve opening. This narrowing may progress to become severe enough to reduce blood flow through the aortic valve and to increase strain on the left ventricle, causing an aortic valve stenosis. When the aortic stenosis becomes severe, aortic valve replacement may be necessary. For diagnosis of an aortic sclerosis and stenosis, the assessment of calcification may be important (e.g. to assess the embolization risk due to plaque rupture). Apart from the amount of calcification also its distribution may be important. It has been shown that the distribution of the plaque load over the three valve cusps may be asymmetric. The unequal distribution of calcification may be one risk factor for paravalvular leakage, since it may interfere with the complete and symmetrical frame expansion after valve replacement. The system and method as claimed may be advantageously used in such a scenario. Namely, the aortic bulbus may be segmented with the annulus and the valve leaflets by, for example, model-based segmentation. Then, the calcification distribution of the valve leaflets may be identified. After the centerline estimation of the aortic bulbus the calcification may be projected onto the aortic bulbus, orthogonal to the centerline or with a correction of the plaque position in the aortic bulbus using the distance along the valve leaflets. Then, the resulting anatomy, anatomic aortic bulbus with projected height of calcification on top of it, may be visualized to the physician. Additionally, the three-dimensional aortic bulbus may be unfolded to a two-dimensional map which may be subdivided in sectors for each of the valve leaflets and indicating the position of the coronary ostia. Advantageously, the invention as claimed may be used for planning of TAVI procedures.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be subdivided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing stage of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for analyzing an image of an aortic valve structure to enable assessment of aortic valve calcifications, the system comprising:
    an image interface for obtaining the image of the aortic valve structure, the aortic valve structure comprising aortic valve leaflets and an aortic bulbus;
    a segmentation subsystem for segmenting the aortic valve structure in the image to obtain a segmentation of the aortic valve structure;
    an identification subsystem for identifying a calcification on the aortic valve leaflets by analyzing the image of the aortic valve structure;
    an analysis subsystem configured for:
i) determining a centerline of the aortic bulbus by analyzing the segmentation of the aortic valve structure;
ii) projecting a redistribution of the calcification from the centerline onto the aortic bulbus, thereby obtaining a projection indicating a location of the calcification as projected onto the aortic bulbus after a valve replacement;
    an output unit for generating data representing the projection,
    wherein the image of the aortic valve structure is a three-dimensional image, thereby obtaining as the projection a three-dimensional projection.

2. The system according to claim 1, wherein:
the analysis subsystem is further configured for unfolding the three-dimensional projection, thereby obtaining a two-dimensional plot indicating the location of the calcification as projected onto the aortic bulbus.

3. The system according to claim 2, wherein the analysis subsystem is further configured for indicating at least one of: a left coronary cusp sector, a right coronary cusp sector, a non-coronary cusp sector, annulus and coronary ostia, in the two-dimensional plot.

4. The system according to claim 1, wherein the analysis subsystem is configured for projecting the calcification in an orthogonal direction from the centerline of the aortic bulbus onto the aortic bulbus.

5. The system according to claim 1, wherein:
the aortic valve structure in the image comprises an annulus of the aortic valve;
the analysis subsystem is further configured for:
    determining a plane containing the centerline and the calcification, wherein the plane is intersected with the annulus at an annulus intersection point, with the aortic bulbus at a first curve and with the valve leaflet at a second curve;
    determining a distance from the calcification to the annulus intersection point along the second curve;
    projecting the calcification in a projection direction onto the aortic bulbus to obtain a projected calcification based on the distance from the calcification to the annulus intersection point such that, after the projection, the distance from the projected calcification to the annulus intersection point along the first curve is the same as the distance from the annulus intersection point to the calcification along the second curve.

6. The system according to claim 1, wherein:
the identification subsystem is further configured for determining an amount of the calcification on the aortic valve leaflets by analyzing the image of the aortic valve structure;
the analysis subsystem is further configured for indicating the amount of the calcification in the projection.

7. The system according to claim 6, wherein:
the analysis subsystem is further configured for quantifying a distribution of calcifications in the aortic valve structure by analyzing the location and the amount of the calcifications;
the output unit is further configured for generating data representing the distribution of the calcifications in the aortic valve structure.

8. The system according to claim 1, wherein:
the aortic valve structure in the image further comprises an ascending aorta and a left ventricle;
the identification subsystem is further configured for identifying a calcification on the ascending aorta or the left ventricle by analyzing the image of the aortic valve structure;
the analysis subsystem is further configured for indicating a location of the calcification on the ascending aorta or the left ventricle in the projection.

9. The system according to claim 1, wherein:
the segmentation subsystem is configured for performing a model-based segmentation of the image by applying a model to the image;
the model encodes at least one of: a left coronary cusp sector, a right coronary cusp sector, a non-coronary cusp sector, an annulus and a coronary ostia.

10. The system according to claim 1, wherein the image is a spectral computed tomography image and the identification subsystem is configured for identifying the calcification by performing a spectral analysis to identify the calcification based on a characterized atomic number of the calcification material.

11. The system according to claim 1, wherein the output unit is a display output and the data is display data representing the projection.

12. A workstation comprising the system according to claim 1.

13. An imaging apparatus comprising the system according to claim 1.

14. A method for analyzing an image of an aortic valve to enable assessment of aortic valve calcifications, the method comprising:
    obtaining an image of an aortic valve structure, the aortic valve structure comprising aortic valve leaflets and an aortic bulbus;
    segmenting the aortic valve structure in the image to obtain a segmentation of the aortic valve structure;
    identifying a calcification on the aortic valve leaflets by analyzing the image of the aortic valve structure;

determining a centerline of the aortic bulbus by analyzing the segmentation of the aortic valve structure;

projecting a redistribution of the calcification from the centerline of the aortic bulbus onto the aortic bulbus, thereby obtaining a projection indicating a location of the calcification as projected onto the aortic bulbus after a valve replacement;

generating data representing the projection, wherein the image of the aortic valve structure is a three-dimensional image, thereby obtaining as the projection a three-dimensional projection.

15. A computer program product stored on a non-transitory computer readable storage medium comprising instructions for causing a processor system to perform the method according to claim 14.

* * * * *